Sept. 2, 1924.
T. W. WALKER
TIRE TOOL
Filed Nov. 10, 1922    2 Sheets-Sheet 1
1,507,146
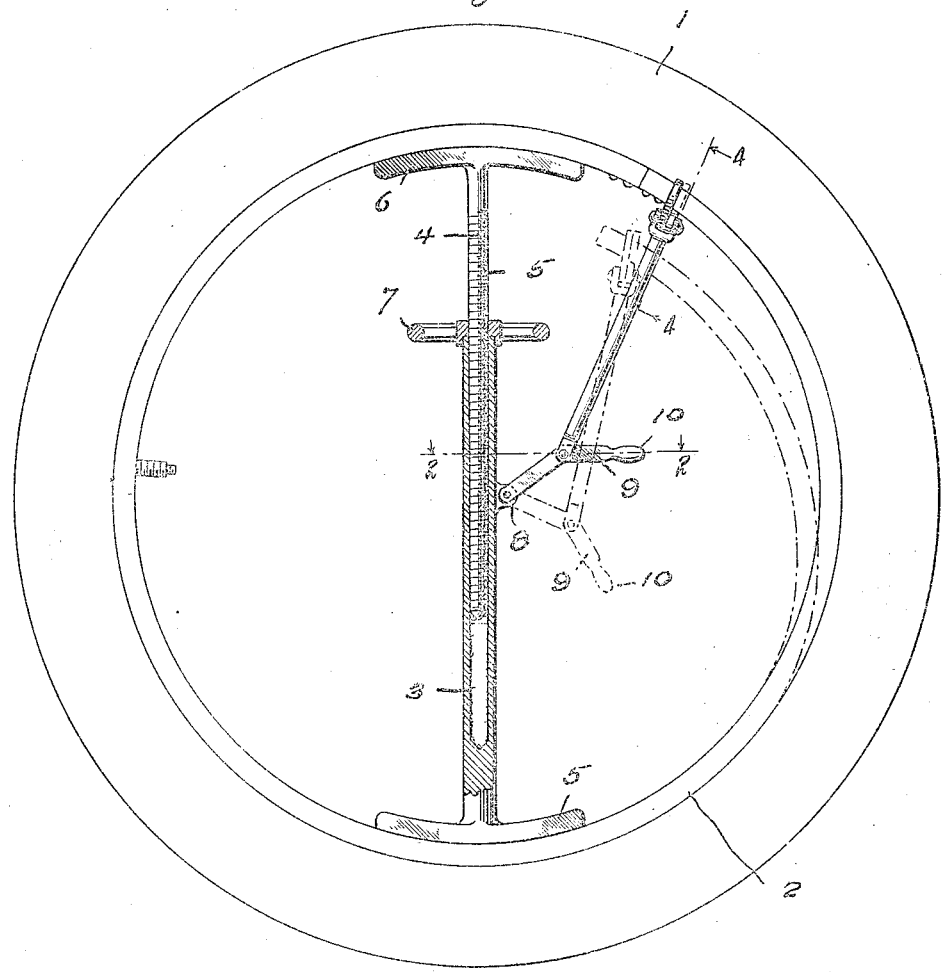
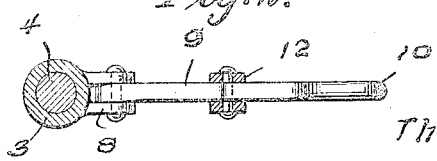
Inventor
Thatcher W. Walker Sept. 2, 1924.                                              1,507,146
                        T. W. WALKER
                         TIRE TOOL
                   Filed Nov. 10, 1922      2 Sheets-Sheet 2

Inventor
Thatcher W. Walker

By
Attorney

Patented Sept. 2, 1924.

1,507,146

UNITED STATES PATENT OFFICE.

THATCHER W. WALKER, OF COLVILLE, WASHINGTON, ASSIGNOR TO THE SECRETARY OF WAR OF THE UNITED STATES OF AMERICA, TRUSTEE.

TIRE TOOL.

Application filed November 10, 1922. Serial No. 600,158.

(FILED UNDER THE ACT OF MARCH 3, 1883, 22 STAT. L., 625.)

*To all whom it may concern:*

Be it known that I, THATCHER W. WALKER, a citizen of the United States, residing at Colville, Wash., have invented an Improvement in Tire Tools, of which the following is a specification.

The invention described herein may be used by the Government, or any of its officers or employees in prosecution of work for the Government, or by any other person in the United States, without payment of any royalty thereon.

This invention relates to a tire tool, especially adapted for use in applying or removing a demountable rim from a tire.

The object in view is to provide a simple, durable and inexpensive device of the class described, which can be promptly applied to the different size rims, is relatively compact, and of light construction.

Further object being to provide means whereby the device is securely mounted within the rim and will operate with no tendency of slipping.

Further object being to provide a device which may be used on substantially any conventional type of split demountable rim without the necessity of structural change therein.

These and other objects in view will appear in the following specification, and be finally pointed out in the appended claim.

Similar numerals indicate corresponding parts in all the figures of the drawings in which:

Fig. 1 is an elevation, partly in section, of the device applied to a rim on which is mounted a tire, the position of the parts in removing the rim being shown in dotted lines.

Fig. 2 is a section on line 2—2 of Fig. 1.

Figure 3:
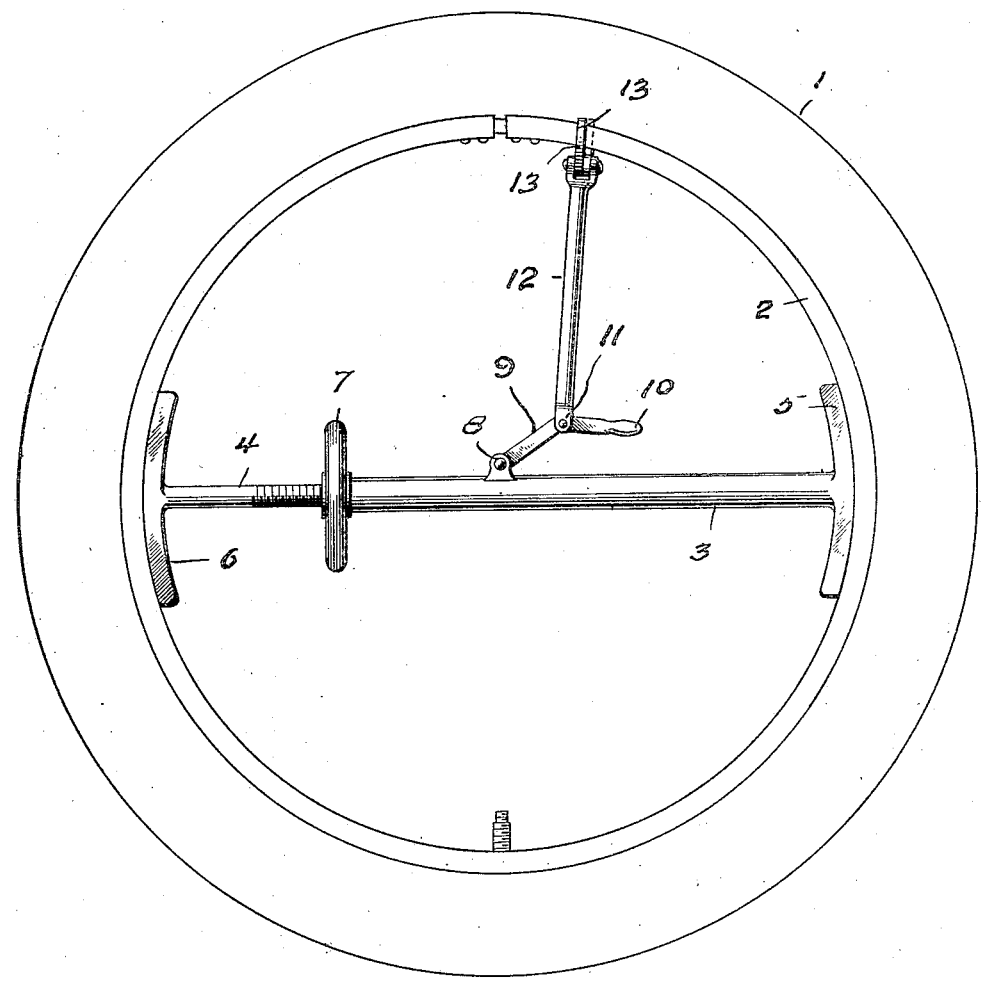
Fig. 3 is an elevation of the device as applied to a rim in a position for applying the rim to the tire.
Figure 4:
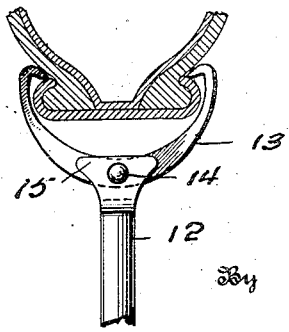
Fig. 4 is an enlarged detail section of a portion of the rim and tire to more fully illustrate the grab hooks at the end of the combined drag and thrust arm taken on line 4—4 of Fig. 1.

Referring to the drawings by numerals, 1 indicates a tire and 2 the usual form of split rim. The tire tool consists of a supporting member having telescoping members 3 and 4, which in turn have shoes or rim fitting segments 5 and 6, respectively.

The member 4 is provided with a screw threaded shank, as shown at 5, on which is threaded the hand wheel 7, said hand wheel being rotatably mounted at the end of the member 3, into which member 4 telescopes.

By adjustment of hand wheel 7, the shoes 5 and 6 at the ends of the clamping member are forced outwardly against the inner face of the rim, and firmly mount what may be termed the supporting member within the rim. Pivotally mounted between ears 8, integral with or mounted on the member 3, is an operating lever 9, provided with a handle 10 at its outer end, and pivotally mounted intermediate its ends at 11 is a combined pull and thrust arm 12, provided at its outer ends with grab hooks 13 adapted to hook into the outer rolled edge of the rim, and are pivotally mounted on pin 14 for adjustment to the different widths of rims.

The arm 12 is further provided with a broadened head 15 adapted to be brought into contact with the inner face of the rim when same is being forced into alinement at its joint.

By reference to Fig. 1, the device is seen adjusted for the removal of a rim, it being seen that the clamping member is arranged in such a position as to place one of the ends of the supporting member adjacent to the split in the rim, and the drag arm 12, with its hooks, is connected with the rim at the opposite side of the split in the rim, and lever 9 is in position to be drawn downwardly and pull one section of the rim away from the other, thereby releasing the rim from the tire and permitting it to be retracted and removed therefrom.

In the position of the parts as shown in Fig. 3, the supporting member has been arranged at right angles to the split in the rim, and by the operation of hand wheel 7, the shoes 5 and 6 are forcibly applied to the inner surface of the rim, and the rim is so expanded as to permit the ends thereof to be brought into alinement and located properly in relation to the tire by the pressure of the enlarged head 15 at the end of the bar 12 by the operation of the lever 9.

In operation the supporting member, by adjustment of the hand wheel, is firmly clamped within the rim,—if for the removal of the rim from the tire one of the shoes is located adjacent to the split in the rim,—if for the application of a rim to the tire, the shoes are arranged at 90 degrees from the split in the rim. In the first place, the hooks 13 are caught over the outer edges of the rim, and by an operation of the lever 9, the adjoining ends of the rim are separated and allowed to cross each other, thereby collapsing the rim and permitting removal from the tire. In the second place, or when the tire is to be applied, the application of the supporting member to the inner surface of the rim sufficiently expands the rim to permit the bringing into alinement of the ends thereof, and rod 12 is then brought into contact with the retracted end to force it outwardly into alinement with the other.

Having thus described my invention, what I claim as new and desire to secure by Letters Patent is:

A tire tool consisting of a supporting member mounted on the inner face at opposite sides of the rim, a combined pull and thrust rod adapted to be caught on the rim at one end, and an operating lever mounted intermediate its end to said rod, and at its end on said supporting member connecting the combined pull and thrust rod with the supporting member.

THATCHER W. WALKER.